(12) United States Patent
Minne

(10) Patent No.: US 11,303,965 B1
(45) Date of Patent: Apr. 12, 2022

(54) TECHNIQUES FOR PROVIDING INTERACTIVE VIDEO

(71) Applicant: Amazon Technologies, Inc., Seattle, WA (US)

(72) Inventor: Benjamin Minne, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 265 days.

(21) Appl. No.: 16/007,934

(22) Filed: Jun. 13, 2018

(51) Int. Cl.
| | |
|---|---|
| *H04N 21/4722* | (2011.01) |
| *H04N 21/437* | (2011.01) |
| *H04N 21/478* | (2011.01) |
| *H04N 21/4782* | (2011.01) |
| *H04N 21/472* | (2011.01) |

(52) U.S. Cl.
CPC ....... *H04N 21/4722* (2013.01); *H04N 21/437* (2013.01); *H04N 21/4782* (2013.01); *H04N 21/47217* (2013.01); *H04N 21/47815* (2013.01)

(58) Field of Classification Search
CPC .............. H04N 21/4722; H04N 21/437; H04N 21/47217; H04N 21/47815; H04N 21/4782
See application file for complete search history.

(56) References Cited

U.S. PATENT DOCUMENTS

| | | | | |
|---|---|---|---|---|
| 2014/0052563 A1* | 2/2014 | Watkins | ............. | G06Q 30/0621 705/26.5 |
| 2014/0089295 A1* | 3/2014 | Becherer | ............. | G06F 16/3328 707/722 |
| 2015/0106856 A1* | 4/2015 | Rankine | ............. | H04N 21/4725 725/60 |
| 2015/0128046 A1* | 5/2015 | Cormican | ........ | H04N 21/23424 715/720 |
| 2016/0249085 A1* | 8/2016 | Ben-Atiya | ......... | H04N 21/6543 |
| 2016/0381427 A1* | 12/2016 | Taylor | .............. | H04N 21/23424 725/13 |
| 2017/0272811 A1* | 9/2017 | Zan | ..................... | H04N 21/4331 |
| 2018/0348966 A1* | 12/2018 | Scoville | .................. | G06F 3/048 |

OTHER PUBLICATIONS

Lilly, Paul; "New Steam Policy Requires Developers To Include Real Screenshots On All Game Pages"; Nov. 2, 2016; hothardware. com (Year: 2016).*

(Continued)

*Primary Examiner* — Nicholas T Corbo
(74) *Attorney, Agent, or Firm* — Kilpatrick Townsend & Stockton LLP

(57) ABSTRACT

System and methods are provided for presenting a video of an item via a network page of an electronic marketplace provider. The video may depict the item in motion. The video frames may be included as part of an image file (e.g., a sprite sheet) such that presentation of the video at a user interface requires only a single download of the image file. A navigational interface may be provided to manipulate the playback of the video. Additional images may be provided with the video that individually depict stationary views of the item. The user may navigate between the navigational interface of the video and a number of selection elements corresponding to the additional images. Thus, efficiency of providing a video of an item is improved as is the ease of navigating between videos and images within an item detail page.

20 Claims, 10 Drawing Sheets

(56) References Cited

OTHER PUBLICATIONS

"A Brand New Steam", May 26, 2017, Valve (steampowered.com), https://web.archive.org/web/20170526053658/https://store.steampowered.com/uiupdate (Year: 2017).*

YouTube username: TopHATTwaffle, "Steam 2010 UI Beta overview", Feb. 24, 2010, Youtube.com (https://www.youtube.com/watch?v=bq4doXUBFLQ) (Year: 2010).* https://www.amazon.com/dp/B005G6O9LO/ref=cm_sw_r_cp_apa_SyMFAbTJH7GQM, printed on Jun. 13, 2018, 8 pages.

http://spritespin.ginie.eu/, printed on Jun. 13, 2018, 3 pages.

* cited by examiner

TECHNIQUES FOR PROVIDING INTERACTIVE VIDEO

BACKGROUND

It has become commonplace for users to purchase items from online merchants. As users peruse various items, it can be difficult for the user to get a sense of the particular characteristics of an item just by viewing a picture of the item. Some conventional systems have utilized a view in which an item is presented at various different angles, or in a rotating view in which the item appears to spin on an axis. However, these implementations typically result in a disjointed presentation that causes frustration for the user and results in inaccurate or insufficient information being conveyed. Embodiments of the invention discussed herein address these and other problems, individually and collectively.

BRIEF DESCRIPTION OF THE DRAWINGS

Various embodiments in accordance with the present disclosure will be described with reference to the drawings, in which.

DETAILED DESCRIPTION

Figure 1:
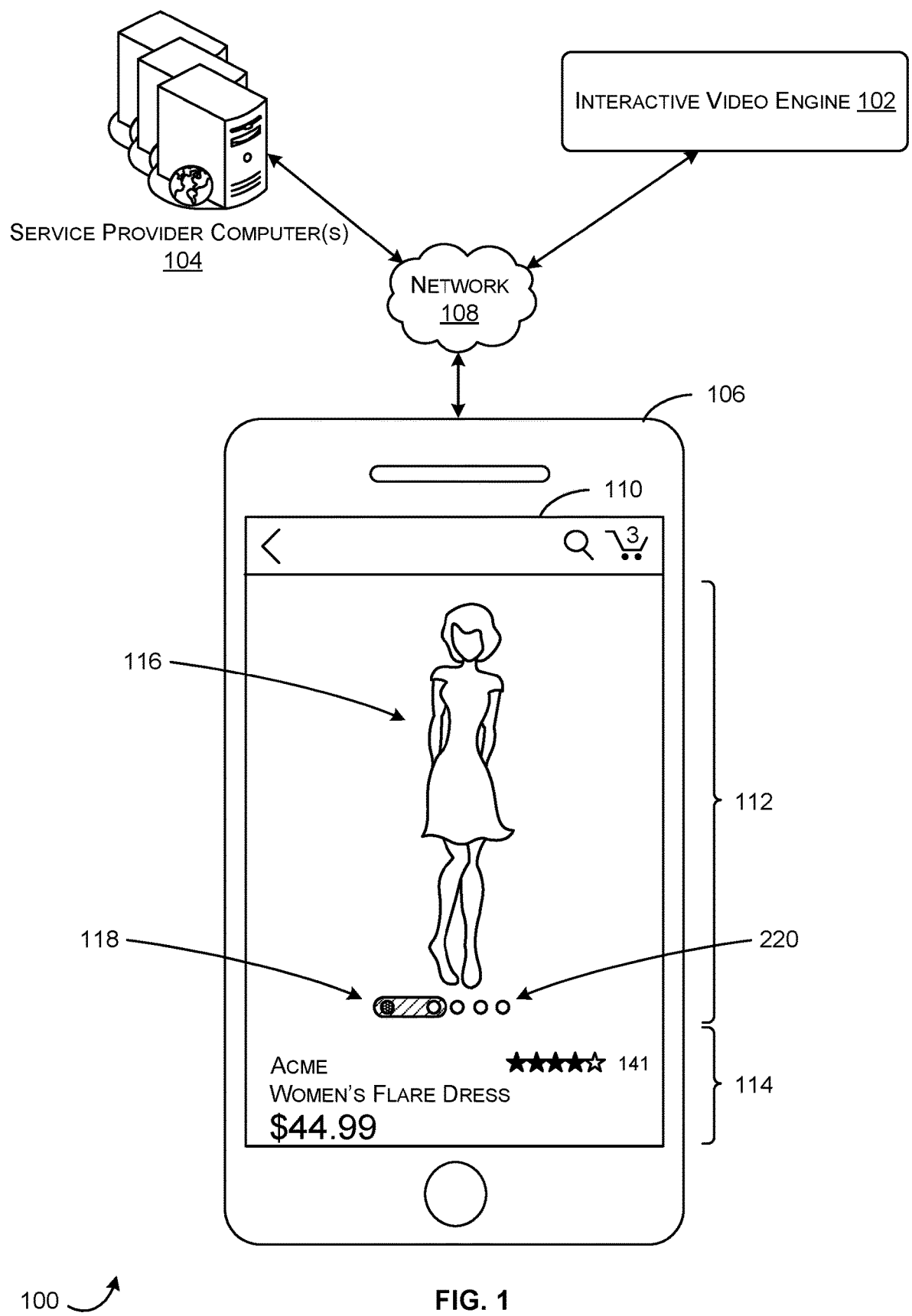
FIG. 1 is a schematic diagram illustrating an example environment suitable for implementing aspects of an interactive video engine, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to providing interactive video to a user utilizing an interactive video engine. In some embodiments, an "electronic marketplace" may be managed by one or more service provider computer(s) (e.g., servers) that host electronic content in the form of an electronic catalog. A user may navigate (e.g., via a browser or shopping application operating on her user device) to a website of the electronic marketplace. By way of example, the user may navigate to an item detail page that is associated with a particular article of clothing such as a particular dress. An item detail page is used throughout this disclosure in various examples. However, it should be appreciated that the use of an item detail page is not intended to limit the scope of this disclosure. It should be appreciated that any suitable webpage such as a search result listing page, a shopping cart page, etc. may be utilized to provide the interactive video techniques discussed herein.

As part of providing the content for rendering the webpage, the service provider (e.g., utilizing the interactive video engine) may provide a number of video frames within a bitmap image file (e.g., a sprite sheet). A bitmap image file may contain several images that are compiled into a single file. Any image of the bitmap image file may be utilized after loading the single bitmap image file. Once loaded, the application may be configured to render the bitmap images in the file as a video at the user device. To the user, the video may provide information that is more difficult, if not impossible, to determine from a traditional item description (e.g., text describing the item's material, style, material of manufacture, etc.). For example, the video may depict a woman moving around in the dress such that the user is able to view how the dress hangs and moves with the model. Additionally, by utilizing the bitmap image file, the process for providing a view of the item is improved. Unlike conventional systems which may request individual images to load on a network page, the techniques described herein utilize a bitmap image file which only requires that single file to be downloaded in order to present multiple images. Accordingly, the load time for the item detail page may be less than a time required to load a traditional video, depending on the video length, compression and player being utilized. This may result in a more pleasant user experience and more efficient utilization of the providing server's processing resources than may be found in conventional systems.

As part of the process for enabling the techniques described herein, the interactive video engine may be configured to obtain images related to an item. The images may be pre-generated using any suitable means. Continuing with the dress examples, one or more videos may be captured of a model moving from one pose to another in a sequence. In some embodiments, the model may move relative to the camera. That is, the camera may not move around the model to capture images of the item. The interactive video engine may be configured to analyze the video in order to determine a number of video frames that may be utilized. In some embodiments, the interactive video engine may analyze the video in order to determine frames which are similar over a particular threshold value. In these instances, the interactive video engine may generate and/or utilize only one of the similar frames in order to decrease a number of video frames needed to provide the video. In some embodiments, the interactive video engine may determine particular frames which provide the most valuable information given the particular subject of the video. As a non-limiting example, through video analysis, the interactive video engine may determine that, for a dress (or this particular dress), that particular frames of the video (or particular portions of the video corresponding to a number of frames) relay the most information about the dress. Thus, portions of the video which provide motion may be prioritized over portions of the video in which the dress remains stationary. Although in some embodiments, the interactive video engine may be configured to ensure that video frames that depict motion as well as frames that depict the item at rest are included in a final set of video frames.

Once a set of video frames are generated and/or identified by the interactive video engine, the set of video frames may be formatted and stored as a bitmap image file (e.g., a sprite sheet). Accordingly, when a corresponding item detail page is requested, the interactive video engine (or a service provider computer that has access to the bitmap image file) may be configured to serve the bitmap image file to the requesting application.

In some embodiments, as the application loads the information for the item detail page, a single image of the item may be displayed (e.g., an image of the item obtained from the bitmap image file). When the bitmap image file is fully loaded, the video may be rendered at the item detail page.

As the video is played at the item detail page, user interface elements may be provided that enable the user to interact with the video. By way of example, the video may be provided with a set of alternative item images as part of a viewing carousel. In some examples, the video may be the first item in the viewing carousel and may automatically play when the bitmap image file is fully loaded. User interface elements such as a slider and/or progress bar may be utilized to enable the user to navigate within the video and/or to show progress through the video. In some embodiments, such as when the user device being utilized includes a touch interface, when the user has navigated to the end of the video (or the video has finished playing) the user may provide a gesture (e.g., swipe) at the touch interface to navigate to the next image in the viewing carousel. By utilizing different user interface elements for videos and still images, the user may be informed of the opportunity to interact with the video. For example, the user can slide the slider to the left to rewind the video and to the right to fast forward through the video. This action may be repeated any suitable number of times.

Utilizing the aspects described herein, the user may be provided a much smoother video render than those provided in conventional 360 degree viewers, as more frames may be provided in a single load. By utilizing a bitmap image file, those video frames may be provided in a more efficient manner which may result in the item detail page being loaded faster than if a traditional video were loaded. Additionally, by utilizing the bitmap image file, the user may navigate within the video without requiring additional requests and/or loading of additional frames unlike conventional systems. Thus, the user's experience is improved, the processing resources of the service provider are preserved, and interaction with the video is enabled in a more efficient manner than previously conceived.

Another benefit of using the bitmap image file to provide an interactive video is that the image format of the images of the bitmap image file may allow for transparent backgrounds to be utilized for the image backgrounds. This may allow the backgrounds of the images to be changed at the client device, where traditional video is not so flexible. As an example, an animated background or personal photo could be used to highlight the subject of the video.

Yet another benefit of the techniques described herein is an improvement to data overhead and accessibility. The techniques described herein do not require video player libraries as the techniques may be provided with JavaScript® and/or cascading style sheets. This has two advantages. In one aspect, the client device need not store video player libraries which results in reduced data storage overhead. As another improvement, the ability to provide the techniques herein using JavaScript and/or cascading style sheets can make the interactive videos of this disclosure more accessible to a wider population as a particular video player is not required and JavaScript and CSS are more widely used/accessible.

FIG. 1 is a schematic diagram illustrating an example environment 100 suitable for implementing aspects of an interactive video engine 102, in accordance with at least one embodiment. The interactive video engine 102 may operate as part of, or separate from, the service provider computer(s) 104. In some embodiments, the service provider computer(s) 104 may be configured to receive requests from user device 106 and serve, in response to the requests, content which may be rendered by an application (e.g., a network browsing application, a shopping-related application, etc.) operating on the user device 106. The service provider computer(s) 104 may, for example, be configured to host an electronic marketplace in which users may browse and/or procure various items available for consumption (e.g., purchase, lease, etc.).

In at least one embodiment, the interactive video engine 102, the service provider computer(s) 104, and/or the user device 106 may be configured to communicate with one another via the network 108. The network 108 may include any one or a combination of many different types of networks, such as cable networks, the Internet, wireless networks, cellular networks, and other private and/or public networks.

As a non-limiting example, a user may utilize an application operating on the user device 106 to navigate to an item detail page 110. The application operating on the user device 106 may request content from the service provider computer(s) 104 and/or the interactive video engine 102. In some embodiments, the interactive video engine 102 may have previously processed a variety of item images (e.g., a video in which the item is presented) and generated a bitmap image file that is them associated with the item detail page 110. Upon receiving a request for the item detail page, the service provider computer(s) 104 (or the interactive video engine 102) may be configured to provide, among other things, the bitmap image file corresponding to the item detail page. Upon receipt of the bitmap image file (or at least a portion of the bitmap image file) the application may be configured to display item detail page 110. Item detail page 110 may include various areas such as, but not limited to, an image viewing area 112 and an item description area 114.

Within the image viewing area 112 one or more videos and one or more images may be provided. By way of example, a model wearing the item (e.g., a women's flare dress manufactured by Acme) may be displayed at 116. The initial image of the model may be provided as one of the video frames of the bitmap image file being/already downloaded. Once the full bitmap image file is loaded, the application may be configured to cause the still image to be replaced and the video to be presented within the image viewing area 112. Thus, while each image of the bitmap image file may individually depict a stationary view of the item, collectively the images of the bitmap image file may depict a video of the item. In some embodiments, the video may depict movement of the item (e.g., the item as worn by a model who is spinning around which causes the dress to flare nearer to the hemline).

In some embodiments, a navigational interface for the video and a set of selection elements for viewing one or more additional images (e.g., images of stationary views of the item) may be provided within image viewing area 112 (or another area). By utilizing the navigational interface, the user may interact with the video. For example, a navigational interface such as slider 118 may be provided to enable the user to rewind and/or fast-forward any suitable number of times within the video. In some embodiments, the set of selection elements may be provided as depicted at 220. Each selection element (e.g., each dot) may correspond to a single image that depicts a stationary view (e.g., differing views) of the item within image viewing area 112. Each image corresponding to the set of selection elements may be provided separately from the bitmap image file, although in some embodiments, these images may be included and delivered within the bitmap image file.

Figure 2:
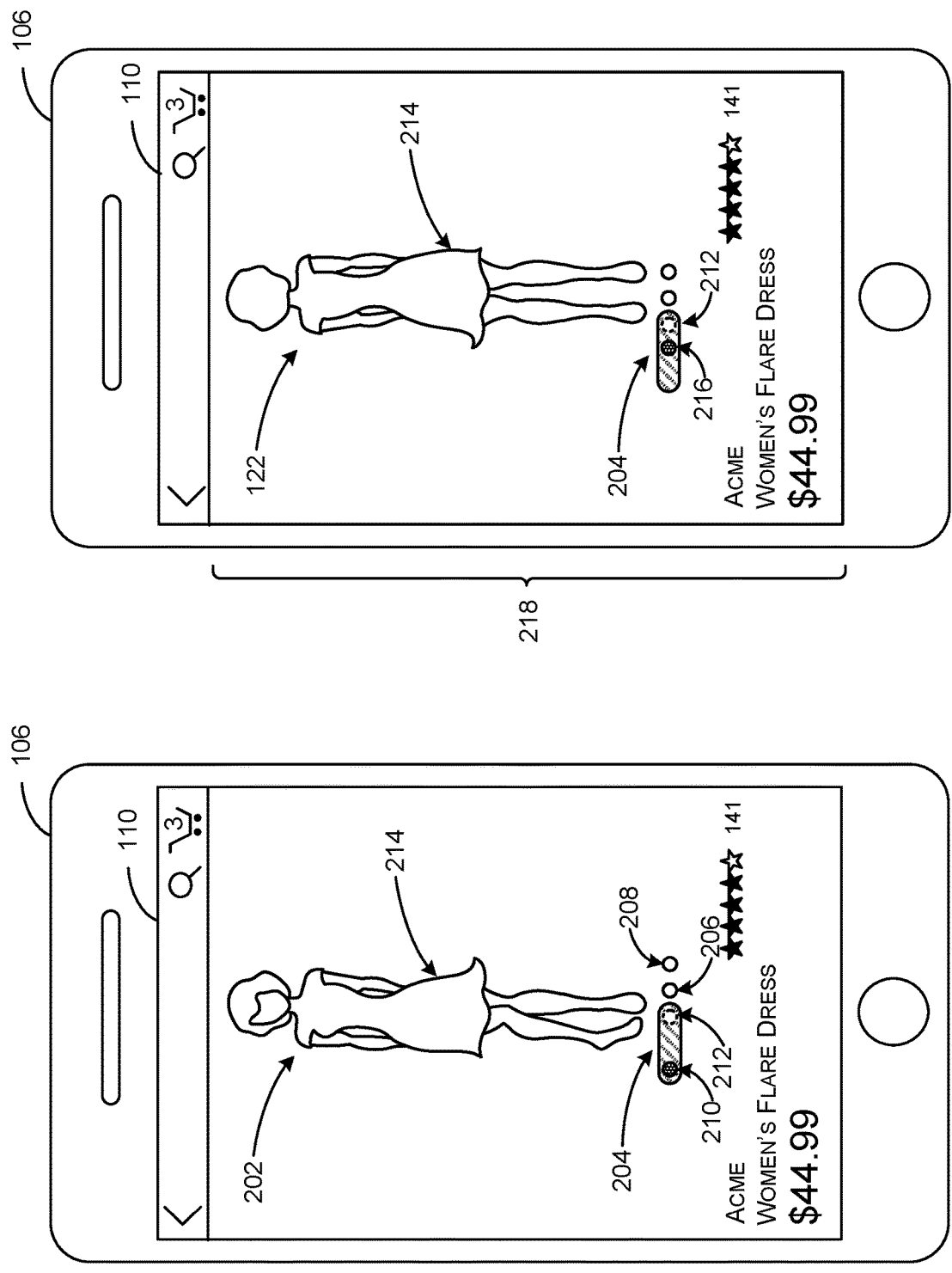
FIG. 2 is a schematic diagram illustrating example interface that may be used to implements aspects of the interactive video engine, in accordance with at least one embodiment.

FIG. 2 is a schematic diagram illustrating example interface 200 that may be used to implements aspects of the interactive video engine 102 of FIG. 1, in accordance with at least one embodiment. In the embodiment depicted in FIG. 2, the item detail page 110 of FIG. 1 is provided via user device 106 which may be a smartphone configured with a touch interface. In some embodiments, in response to a data request for content associated with the item detail page 110, a bitmap image file (depicting the item in motion) and a set of images depicting a stationary view of the item may be provided to the user device 106. Initially, an image 202 may be provided on the item detail page 110 as a remaining portion of the bitmap image file is loaded. The image 202 may be one of the images included in the bitmap image file (or one of the set of images depicting a stationary view of the item). In some examples, the set of images depicting a stationary view of the item may be included as part of the bitmap image file.

Along with the image 202, a navigational interface 204 and a set of selection elements (e.g., selection elements 206 and 208) may be provided within the item detail page 110. The set of selection elements may correspond to a number of the set of images. That is, each of the set of images may have a corresponding selection element. In some embodiments, the navigational interface 204 may include a starting point 210 and an ending point 212 which respectively correspond to a starting frame of the bitmap image file and an ending frame of the bitmap image file. Once the bitmap image file is fully loaded, the application operating on the user device 106 may be configured to automatically play a video (e.g., starting at the start frame and playing through to the end frame) from the various video frames provided in the bitmap image file. As a non-limiting example, the video frames of the bitmap image may collectively provide a video in which a model wearing a dress 214 turns 360 degrees around. It should be appreciated that this is a simplistic example for purposes of illustration and the video may include any suitable combination of one or more motions of any suitable complexity and duration.

As the video progresses, the navigational interface 204 may utilize progress indicator 216 to indicate a current location within the video being played. In some embodiments, the user may manipulate (e.g., select and drag) the progress indicator 216 along the navigational interface (e.g., to the left or to the right) to rewind or fast-forward through the video. While the progress indicator 216 is moved, the video may be played (forwards or backwards) at a speed which matches the dragging motion. This is merely one example, the speed at which the video is played may be modified based at least on other factors such as the length of the video corresponding to the bitmap image file, the actual number of images included in the bitmap image file, according to a predetermined rule, etc. In some embodiments, such as those in which the user device 106 includes a touch interface, the user may navigate forwards or backwards within the video by dragging an input object (e.g., a stylus, a finger, etc.) to the left or right within the area 218 without necessarily directly manipulating the progress indicator 216 itself. In some embodiments, the image 220 of the bitmap image file may be presented (via the video) at a time corresponding to the location of the progress indicator 216 within the navigational interface 204. In this example, the model within the video may have executed a 180 degree turn from the initial starting image to depict the dress 214 as it appears when viewed from behind the model. In some embodiments, through manipulation or through standard playback, the video may reach an end frame. In some embodiments, upon reaching the end frame (corresponding to the end of the video) the video may be paused/stopped, or the video may begin playback again from the starting frame.

Once the ending point 212 has been reached (through standard playback or by manipulating the progress indicator 216), further touch input (e.g., swipes to the left) may be utilized to navigate to the stationary images corresponding to the selection elements 206 and 208. For example, upon reaching the ending frame of the video corresponding to ending point 212, the user may swipe once to the left to navigate to an image corresponding to the selection element 206. Another swipe to the left may then cause the image corresponding to the selection element 208 to be depicted. In some embodiments, the selection elements 206 and 208 may be individually selected through user input other than gesture. For example, either of the selection elements 206 and/or 208 may be selected by clicking on the selection elements 206 and/or 208 without utilizing a swipe or other gesture-type input.

Figure 3:
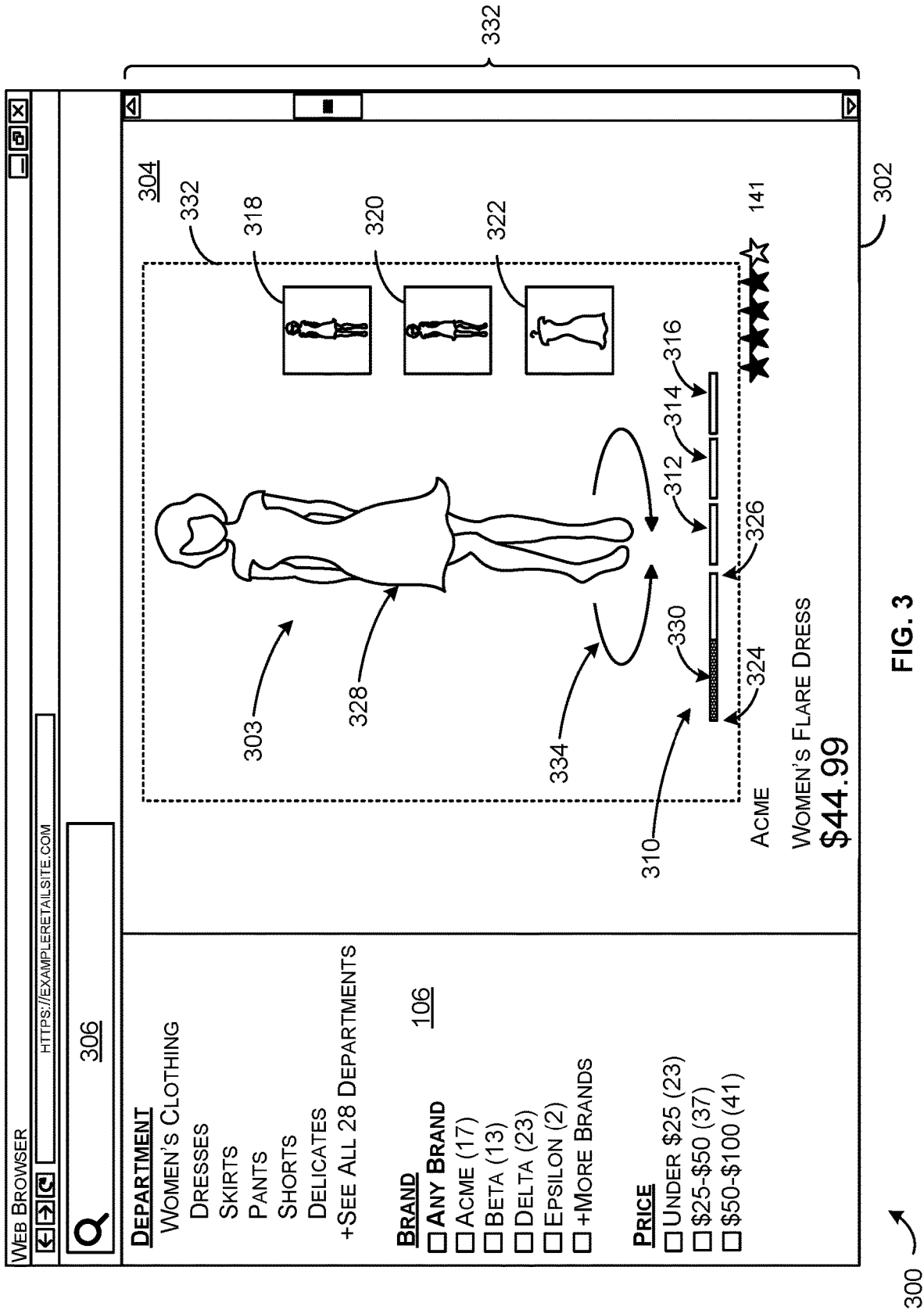
FIG. 3 is a schematic diagram illustrating another example of interface that may be used to implements aspects of the interactive video engine, in accordance with at least one embodiment.

FIG. 3 is a schematic diagram illustrating another example interface 300 that may be used to implements aspects of the interactive video engine 102 of FIG. 1, in accordance with at least one embodiment. It should be appreciated that the interface 200 of FIG. 2 and the interface 300 are intended to be illustrative in nature. Other interface configurations which may utilize similar or different interface elements (e.g., sliders, progress bars, etc.) are contemplated. Returning to the example provided in FIG. 3, the item detail page 110 of FIG. 1 is provided via an internet browser 302. In some embodiments, the user may utilize input a search query in the search box 306 to eventually navigate to the item detail page 304. Additionally, or alternatively, the user may utilize a filter pane 308 to filter search results before eventually selecting an item which corresponds to the item detail page 304.

Once the item corresponding to the item detail page 304 is selected, the user device may be configured to request the content corresponding to the item detail page 304 (e.g., from a service provider computer such as the service provider computer(s) 104 of FIG. 1). The user device presenting the item detail page 110 may be any suitable device such as a laptop or smartphone. The user device may or may not include a touch interface. In some embodiments, in response to a data request for content associated with the item detail page 110, a bitmap image file (depicting the item in motion) and a set of images depicting a stationary view of the item may be provided. Initially, an image 303 may be provided on the item detail page 110. The image 303 may be initially provided during a time in which a remaining portion of the bitmap image file is being loaded. The image 303 may be one of the images included in the bitmap image file (or one of the set of images depicting a stationary view of the item). In some examples, the set of images depicting a stationary view of the item may be included as part of the bitmap image file.

Along with the image 303, a navigational interface 310 and a set of selection elements (e.g., selection elements 312, 314, and 316) may be provided within the item detail page 304. The set of selection elements may correspond to a number of the set of images. That is, each of the set of images may have a corresponding selection element. For example, selection element 312 may correspond to an image 318, selection element 314 may correspond to an image 320, and selection element 316 may correspond to an image 322. The images 318, 320, and/or 322 may individually depict stationary views of the item. All, or some portion of these images may be provided separate from the bitmap image file or, in some embodiments, the images 318, 320, and/or 322 may be provided within the bitmap image file.

In some embodiments, the navigational interface 310 may include a starting point 324 and an ending point 326 which respectively correspond to a starting frame of the bitmap image file and an ending frame of the bitmap image file. It should be appreciated that the starting frame of the bitmap image file is not necessarily the first image of the bitmap image file, nor is the ending frame of the bitmap image file necessarily the last image of the bitmap image file. The bitmap image file may include any suitable number of images, in any suitable order. Some of those images may collectively be utilized to provide a video according to an order of frames designated by the bitmap image file.

Once the bitmap image file is fully loaded, the application operating on the user device may be configured to automatically play a video (e.g., starting at the start frame and playing through to the end frame) from the various video frames provided in the bitmap image file. As a non-limiting example, the video frames of the bitmap image may collectively provide a video in which a model wearing a dress 328 shifts to various poses where the shifting causes the dress 328 to move. It should be appreciated that this is a simplistic example for purposes of illustration and the video may include any suitable combination of one or more motions of any suitable complexity and duration.

As the video progresses, the navigational interface 310 may utilize progress indicator 330 to indicate a current location within the video being played. In some embodiments, the user may manipulate (e.g., select and drag) the progress indicator 330 along the navigational interface (e.g., to the left or to the right) to rewind or fast-forward through the video. While the progress indicator 330 is moved, the video may be played (forwards or backwards) at a speed which matches the dragging motion. In some embodiments, such as those in which the user device includes a touch interface, the user may navigate forwards or backwards within the video by dragging an input object (e.g., a stylus, a finger, etc.) to the left or right within the area 332 without necessarily directly manipulating the progress indicator 330 itself. In some embodiments, through manipulation or through standard playback, the video may reach the ending point 326. In some embodiments, upon reaching the ending point 326 (corresponding to the end of the video), the video may be paused at the ending point, or in some embodiments, the video may begin again at the starting point 324.

Once the ending point 326 has been reached (through standard playback or by manipulating the progress indicator 330), further input may be utilized to navigate to the stationary images corresponding to the selection elements 312, 314, and/or 316. For example, upon reaching the ending frame of the video corresponding to ending point 326, the user (via a touch interface of the user device) may swipe once to the left to navigate to an image 318 corresponding to the selection element 312. Upon selection, the image 318 may replace the image 302 as the focus of the item detail page 304 and a smaller image depicting the video may be depicted to the right of the now enlarged image 318 (or at any suitable location within the item detail page 304). Another swipe to the left may then cause the image 320 corresponding to the selection element 314 to be replace image 318, and a smaller version of the image 318 may be depicted to the right of the now enlarged image 320 (or at any suitable location within the item detail page 304). Another swipe to the left may then cause the image 322 corresponding to the selection element 316 to be replace image 320, and a smaller version of the image 320 may be depicted to the right of the now enlarged image 322 (or at any suitable location within the item detail page 304). In some embodiments, the selection elements 312, 314, and 316 may be individually selected through user input other than gesture input. For example, any of the selection elements 312, 314, and/or 316 may be selected by clicking on the selection elements 312, 314, and/or 316 without utilizing a swipe or other gesture-type input. In some embodiments, the smaller versions of the images 318, 320, and 322 may also be considered selection elements. Thus, a user may additionally, or alternatively, select any of the smaller versions of the images 318, 320, and/or 322 to enlarge the image and replace the focal image with the selected image.

In some embodiments, the user may be currently viewing an enlarged view of image 318. The user may provide input (e.g., a swipe to the right, or select any portion of the navigational interface 310) to navigate back to viewing the video. In some embodiments, if the video is once again provided, it may start at the starting point 324 or any suitable location within the video.

In some embodiments, an indicator 334 may be provided to indicate to the user that a video provided is interactive. The indicator 334 may be provided as part of an image of the bitmap image file or display information regarding the display of the indicator 334 may be provided (e.g., as a separate file such as an XML or JSON file). In some embodiments, the indicator 334 may be an HTML element that is overlaid (e.g., based on the display information) over the image 303 and/or any number of images from the bitmap image file. In fact, other HTML elements (not depicted) may be provided (e.g., within the images of the bitmap image file, as a separate data file, etc.) and overlaid over the image 303. By way of example, display data associated with an HTML may indicate that text and/or additional images are to be overlaid of image 303. By way of example, an HTML element that includes the text "Perfect for Summer BBQ's" may be overlaid within the image 303, either directly over the dress, or at some other location within the image 303.

Figure 4:
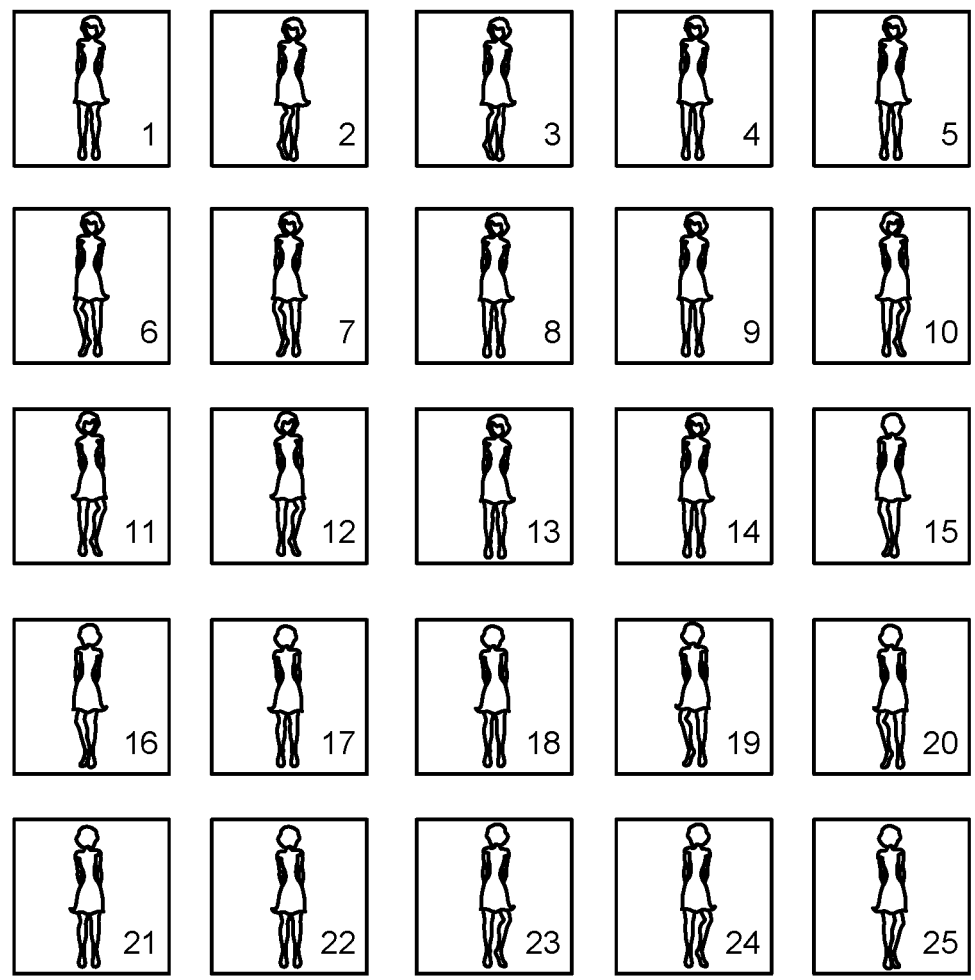
FIG. 4 is a schematic diagram illustrating an example bitmap image file for providing video frames to implement aspects of the interactive video engine, in accordance with at least one embodiment.

FIG. 4 is a schematic diagram illustrating an example image file 400 for providing video frames to implement aspects of the interactive video engine 102 of FIG. 1, in accordance with at least one embodiment. The image file 400 is intended to depict an example of the bitmap image files discussed above in connection with FIGS. 1-3. Although examples herein discuss the image file as being in a "bitmap" format, it should be appreciated that any of the image files discussed herein may utilize any suitable image format, not necessarily a bitmap format. It should be appreciated that a number of images are depicted within the image file 400 but that the number images may vary according to particular aspects of the video. For example, for a video depicting a 360 degree view of an item, 120 frames, or 180 frames, or any suitable number of frames may be provided. In some embodiments, each of the images within the image file 400 may be utilized to provide a video, while in other embodiments, only a portion of the image of the image file 400 may be utilized to provide a video of the item. Thus, in some embodiments, additional images (e.g., images depicting a stationary view of the item) may also be included in the image file 400.

In some embodiments, the images included within the image file 400 may be associated with an order and/or an identifier. In the example depicted, each image is associated with an identifier (e.g., 1-25). For purposes of this example, the identifier also indicates an order by which the images are to be utilized in order to provide a video of the item in motion. Although the image of the image file 400 appear sequential, it is not necessarily the case that the images are arranged in sequential order with respect to the order in which they may be utilized to provide the video of the item.

The image file 400 may be pre-generated by the interactive video engine 102 of FIG. 1. The generation of the image file 400 may be discussed in further detail with respect to FIG. 6. It should be appreciated that the image file 400 may be configured to be loadable from a single data request (e.g., a request for content associated with a particular item detail page).

Figure 5:
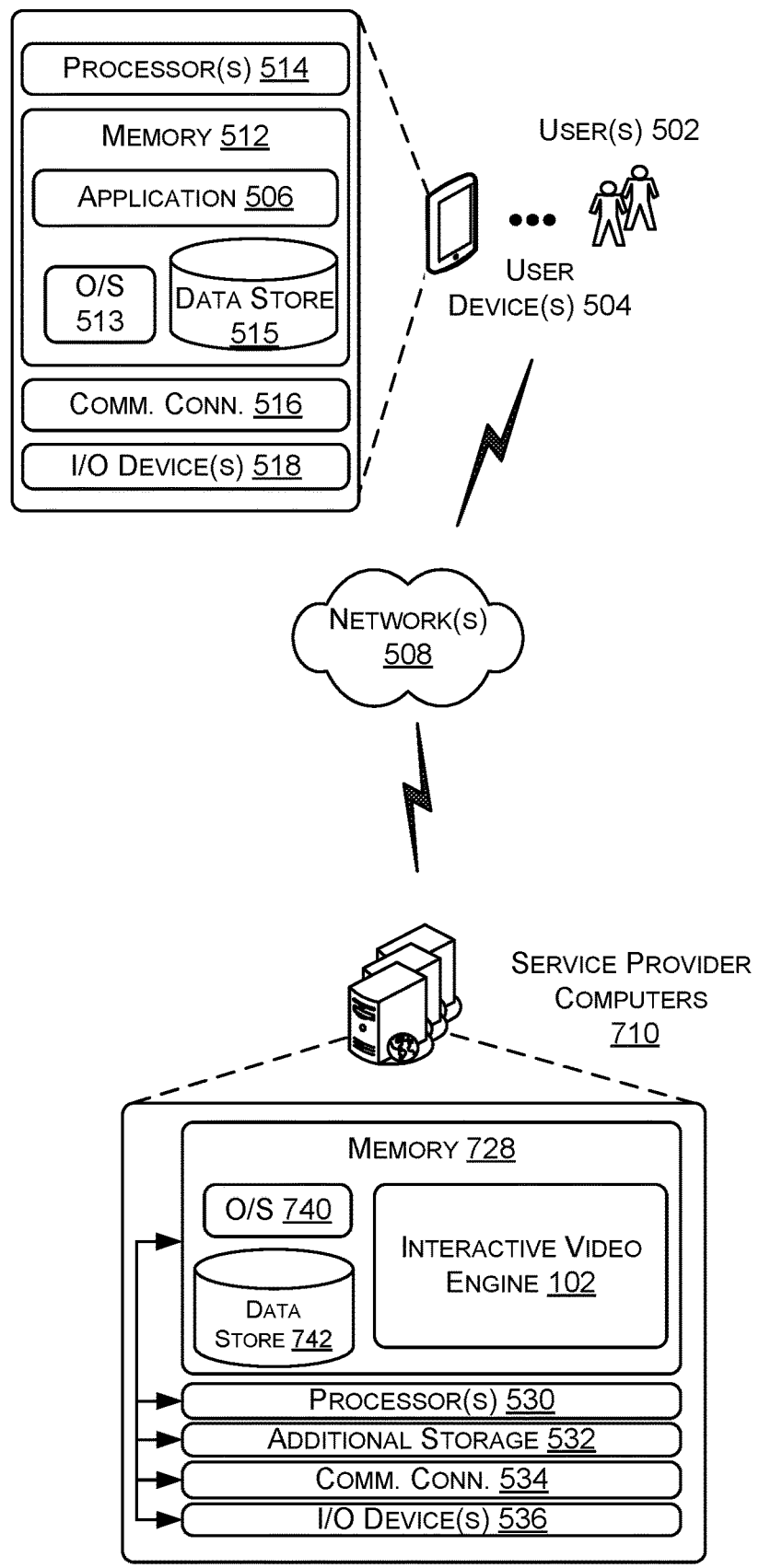
FIG. 5 illustrates components of an interactive video system according to a particular embodiment.

FIG. 5 illustrates components of a system 500 according to a particular embodiment. In system 500, one or more users 502 may utilize a user device (e.g., a user device of a collection of user devices 504 to navigate to a network page provided by the service provider computer(s) 510 (e.g., service provider computer(s) 104 of FIG. 1). For example, the user may access a user interface accessible through an application 506 running on the user devices 504 via one or more networks 508. In some aspects, the application 506 operating on the user devices 504 may be hosted, managed, and/or provided by a computing resources service or service provider, such as by utilizing one or more service provider computer(s) 510.

In some examples, the networks 508 may include any one or a combination of many different types of networks, such as cable networks, the Internet, wireless networks, cellular networks, and other private and/or public networks. While the illustrated example represents the users 502 accessing application functionality over the networks 508, the described techniques may equally apply in instances where the users 502 interact with the service provider computer(s) 510 via the one or more user devices 504 over a landline phone, via a kiosk, or in any other suitable manner. It should be appreciated that the described techniques may apply in other client/server arrangements, as well as in non-client/server arrangements (e.g., locally stored applications, etc.).

As described briefly above, the application 506 may allow the users 502 to interact with the service provider computer(s) 510 so as to provide the various functionality described above. For example, a user may utilize the application 506 to browse for various items in an electronic marketplace. In at least one example, the application 506 may provide a network page (e.g., an item detail page such as item detail page 110 of FIG. 1) with which the users 502 may view an item and information (e.g., videos, images, descriptive text, etc.) associated with the item. The application 506 may be configured to receive/obtain an image file (e.g., the image file of FIG. 4) and utilize the images of the image file to provide video and/or stationary images of the item via the network page. The application 506 may further be configured to provide the navigational interface (or any suitable navigational interface associated with a video) and/or one or more selection elements such as the navigational interfaces and the selection elements discussed above in connection with FIGS. 2 and 3.

The service provider computer(s) 510, perhaps arranged in a cluster of servers or as a server farm, may host the application 506 operating on the user devices 504 and/or cloud-based software services. Other server architectures may also be used to host the application 506 and/or cloud-based software services. The application 506 operating on the user devices 504 may be capable of handling requests from the users 502 and serving, in response, various user interfaces that can be rendered at the user devices 504. The application 506 operating on the user devices 504 can present any suitable type of website that supports user interaction, including search engine sites, item detail pages, and the like. The described techniques can similarly be implemented outside of the application 506, such as with other applications running on the user devices 504.

The user devices 504 may be any suitable type of computing device such as, but not limited to, a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the user devices 504 may be in communication with the service provider computer(s) 510 via the networks 508, or via other network connections.

In one illustrative configuration, the user devices 504 may include at least one memory 512 and one or more processing units (or processor(s)) 514. The processor(s) 514 may be implemented as appropriate in hardware, computer-executable instructions, firmware, or combinations thereof. Computer-executable instruction or firmware implementations of the processor(s) 514 may include computer-executable or machine-executable instructions written in any suitable programming language to perform the various functions described.

The memory 512 may store program instructions that are loadable and executable on the processor(s) 514, as well as data generated during the execution of these programs. Depending on the configuration and type of user computing device, the memory 512 may be volatile (such as random access memory (RAM)) and/or non-volatile (such as read-only memory (ROM), flash memory, etc.). The user devices 504 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 512 may include multiple different types of memory, such as static random access memory (SRAM), dynamic random access memory (DRAM), or ROM.

Turning to the contents of the memory 512 in more detail, the memory 512 may include an operating system 513, one or more data stores 515, and one or more application programs, modules, or services for implementing the features of the interactive video engine 102 disclosed herein, provided via the application 506 (e.g., a browser application, an electronic marketplace shopping application, etc.). The application 506 may be configured to receive, store, and/or display a network page or other interface for interacting with the service provider computer(s) 510. Additionally, the memory 512 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user devices 504 may also contain communications connection(s) 516 that allow the user devices 504 to communicate with a stored database, another computing device or server (e.g., the service provider computer(s) 510), user terminals and/or other devices on the networks 508. The user devices 504 may also include I/O device(s) 518, such as a keyboard, a mouse, a pen, a voice input device, a touch input device, a display, speakers, a printer, etc.

In some aspects, the service provider computer(s) 510 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 510 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 510 may be in communication with the user devices 504 and/or other service providers via the networks 508 or via other network connections. The service provider computer(s) 510 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 510 may include at least one memory 528 and one or more processing units (or processor(s)) 530. The processor(s) 530 may be implemented as appropriate in hardware, computer-executable instructions, firmware, or combinations thereof. Computer-executable instruction or firmware implementations of the processor(s) 530 may include computer-executable or machine-executable instructions written in any suitable programming language to perform the various functions described.

The memory 528 may store program instructions that are loadable and executable on the processor(s) 530, as well as data generated during the execution of these programs. Depending on the configuration and type of service provider computer(s) 510, the memory 528 may be volatile (such as RAM) and/or non-volatile (such as ROM, flash memory, etc.). The service provider computer(s) 510 or servers may also include additional storage 532, which may include removable storage and/or non-removable storage. The additional storage 532 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 528 may include multiple different types of memory, such as SRAM, DRAM, or ROM.

The memory 528, the additional storage 532, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 528 and the additional storage 532 are all examples of computer storage media. Additional types of computer storage media that may be present in the service provider computer(s) 510 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 510. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 510 may also contain communications connection(s) 534 that allow the service provider computer(s) 510 to communicate with a stored database, another computing device or server, user terminals and/or other devices on the networks 508. The service provider computer(s) 510 may also include I/O device(s) 536, such as a keyboard, a mouse, a pen, a voice input device, a touch input device, a display, speakers, a printer, etc.

Turning to the contents of the memory 528 in more detail, the memory 528 may include an operating system 540, one or more data stores 542, and/or one or more application programs, modules, or services for implementing the features disclosed herein, such as the features provided by the interactive video engine 102.

Figure 6:
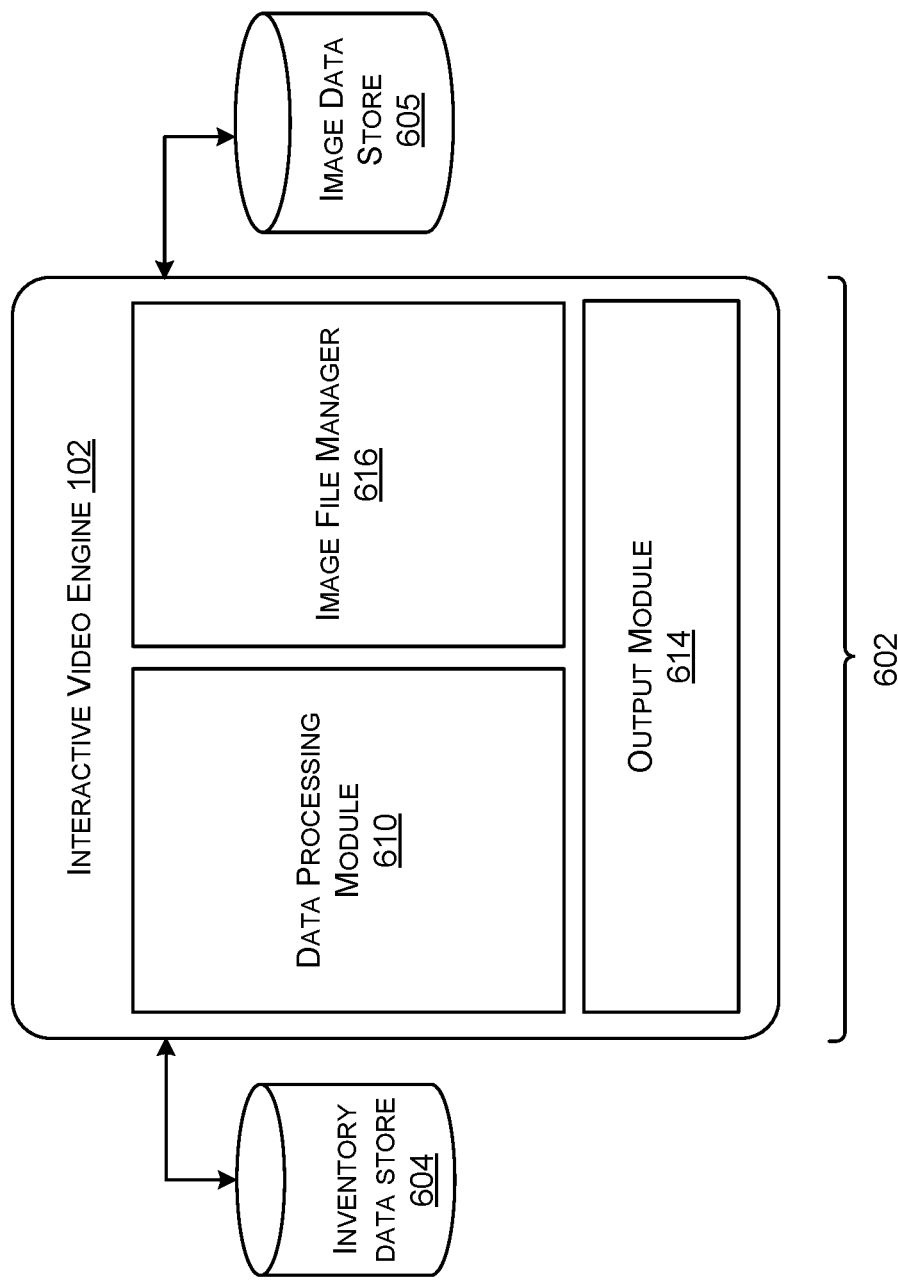
FIG. 6 is a schematic diagram of an example computer architecture for the interactive video engine, including a plurality of modules that may perform functions in accordance with at least one embodiment.

FIG. 6 is a schematic diagram of an example computer architecture 600 for the interactive video engine 102 of FIG. 1, including a plurality of modules 602 that may perform functions in accordance with at least one embodiment. The modules 602 may be software modules, hardware modules, or a combination thereof. If the modules 602 are software modules, the modules 602 can be embodied on a computer readable medium and processed by a processor in any of the computer systems described herein. It should be noted that any module or data store described herein, may be, in some embodiments, be a service responsible for managing data of the type required to make corresponding calculations. The modules 602 may be exist as part of the interactive video engine 102 operating on the service provider computer(s) 510 of FIG. 5, or the modules may exist as separate modules or services external to the service provider computer(s) 510 (e.g., as part of the application 506 of FIG. 5 operating on the user devices 504 of FIG. 5).

In the embodiment shown in the FIG. 6, an inventory data store 604 and an image data store 605 are shown, although data can be maintained, derived, or otherwise accessed from various data stores, either remote or local to the interactive video engine 102, to achieve the functions described herein. In at least one embodiment, the data stores described herein may be physically located on the user device(s) 504 or alternatively, any suitable combination of the data stores may be operated as part of the service provider computer(s) 510, for example, as part of an interactive video engine 102. The interactive video engine 102, as shown in FIG. 6, includes various modules such as a data processing module 610, an image file manager 616, and an output module 618. Some functions of the modules 610, 616, and 618 are described below. However, for the benefit of the reader, a brief, non-limiting description of each of the modules is provided in the following paragraphs. In accordance with at least one embodiment, a process is enabled for providing an image file (e.g., the image file 400) from which a video may be presented.

In at least one embodiment, the interactive video engine 102 includes the data processing module 610. Generally, the data processing module 610 may be utilized to receive any suitable information with respect to any example provided herein. The data processing module 610 may include any suitable number of application programming interfaces with which the functionality of the interactive video engine 102 may be invoked.

In some embodiments, the data processing module 610 may be configured to receive a prerecorded video. The prerecorded video may be any suitable duration. In some examples, the prerecorded video may depict an item in motion (e.g., a dress as worn by a moving model, a car on a moving platform, a flag waving from a flagpole, etc.). Once received, the data processing module 610 may be configured to provide the prerecorded video to the image file manager 616 and/or to store the video in image data store 605 for later retrieval.

In some embodiments, the data processing module 610 may be utilized to provide item information in response to data requests associated with an item. The data processing module 610 may be configured to serve content corresponding to network pages of an electronic marketplace or the data processing module 610 (and the interactive video engine 102) may operate separate from service provider computer(s) (e.g., the service provider computer(s) 510 of FIG. 5) which may be configured to host the electronic marketplace and provide various network pages of the electronic marketplace (e.g., the item detail pages discussed above). If separate from the service provider computer(s), the data processing module 610 may be configured to receive data requests (e.g., from the service provider computer(s) 510) for content (e.g., images and/or video(s)) associated with an item corresponding to an item detail page. Upon receipt, the data processing module 610 may forward the data request to the output module 614 discussed in further detail below.

In some embodiments, the data processing module 610 may access the inventory data store 604, a data store configured to store information about one or items being offered for consumption via the electronic marketplace. The data processing module 610 may be further configured to access the image data store 605 in order to retrieve one or more images and/or one or more image files (e.g., the image file 400 of FIG. 4) in response to data requests. It should be appreciated that in some embodiments, the item information, images, and/or video may be stored as depicted in the inventory data store 604 and the image data store 605, while in other embodiments, the item information and the image(s)/video(s) associated with the item may be stored in a single data store accessible to the data processing module 610.

In some embodiments, the data processing module 610 may be configured to receive user input provided via the navigational interfaces and/or selection elements discussed above with respect to the figures above. The data processing module 610 may be configured to utilize the user input provided at the navigational interfaces and/or selection elements to provide content to the output module 614 for display at the user device. By way of example, the data processing module 610 may receive user input associated with a navigational interface corresponding to a video being provided via an item detail page. The user input may indicate, among other things, a current location within the video being played. Accordingly, the data processing module 610 may be configured to provide image frames of the video according to the user input. By way of example, instances of user input may be received in quick succession indicating that the user is dragging a progress indicator along the navigational interface to fast forward the video. Accordingly, the data processing module 610 may be configured to provide images corresponding to the video in accordance with the user input to the output module 614 for display at the item detail page. It should be appreciated that aspects of the data processing module 610 may be executed by a system that is remote with respect to the user device (e.g., a user device 504 of FIG. 5). However, in some embodiments, aspects of the data processing module 610 may be executed as part of an application (e.g., the application 506 of FIG. 5) operating on a user device 504. If executing as part of the application 506, the images may be retrieved from local memory of the user device and provided (e.g., by the output module 614) at the user device. By retrieving the image(s) from local memory and processing them locally according to user input, additional network traffic for requesting these images from a server may be avoided.

According to some embodiments, the image file manager 616 may be configured to receive a prerecorded video. Upon receipt, or at any suitable time, the image file manager 616 may be configured to process the recorded video to generate an image file (e.g., the image file 400 of FIG. 4). For example, the image file manager 616 may be configured to decompose the video into any suitable number of images corresponding to video frames. In some embodiments, the image file manager 616 may be configured to utilize image processing techniques to compare pairs (or sets) of video frames to determine a degree of similarity between the video frames. In some examples, the image file manager 616, upon determining that a pair/set of video frames have a degree of similarity that is above a threshold amount. If the video frames are determined to be similar over the threshold amount, the image file manager 616 may be configured to discard all but one image of the pair/set. The image file manager 616 may then generate an image file and/or store the image in the generated image file (or a previously generated image file). Thus, the image file manager 616 may be utilized to reduce a number of images in the video to a reduced set of images to be included in the image file.

Once the video has been decomposed (and potentially the number of frames reduced), and the images stored within an image file, the image file manager 616 may be configured to store the image file within the inventory data store 604 and/or the image data store 605. In some embodiments, the image file may be associated with a particular item (e.g., the item which is the subject of the video), an item identifier (e.g., an identifier received with the prerecorded video), etc. As a non-limiting example, the image file may be stored in the image data store 605 and associated with an item identifier corresponding to an item entry of the inventory data store 604.

The image file manager 616 may associated each image of the image file with an identifier to indicate an order with which the images are to be played when presented as a video. Additionally, or alternatively the image file manager 616 may embed information within the image file that indicates an order by which the images are to be played when presented as a video. Additional images (e.g., images that depict a stationary view of the item) may be retrieved by the image file manager 616 from, for example, the inventory data store 604. These images may be embedded in the image file generated by the image file manager 616 and stored as part of the image file within the image data store 605. In some embodiments, these additional images may be identified by any suitable identifier within the image file in order to distinguish them from images of the video.

In some embodiments, the image file manager 616 may be configured to utilize image processing techniques to identify a suitable starting point and/or ending point of the prerecorded video. By way of example, the image file manager 616 may identify a starting point that indicates that the subject of the video is in a position that is facing forward. The decomposed video frames may be analyzed to determine another video frame that depicts the subject of the video at a similar position. Given a degree of similarities between these two positions, the image file manager 616 may determine that the video is to start at the first image and end at the second image (with potentially any suitable number of frames in between). Accordingly, the image file manager 616, through this process, may cause the video eventually presented utilizing the image file to appear as if in a continuous loop. That is, the video, if replayed, may appear as a continuous loop with little to no interruption noticeable between the end of the video and when the video is started over.

According to some embodiments, the output module 614 may be configured to receive item information, images, and/or an image file from the data processing module 610 (e.g., operating at the user device or as a part of the service provider computer(s) 510 of FIG. 5). Upon receipt of the item information, images, and/or the image file, the output module 614 may be configured to present any suitable combination of the item information, images, and/or the image file at the user device (e.g., via an item detail page being displayed at the user device).

Figure 7:
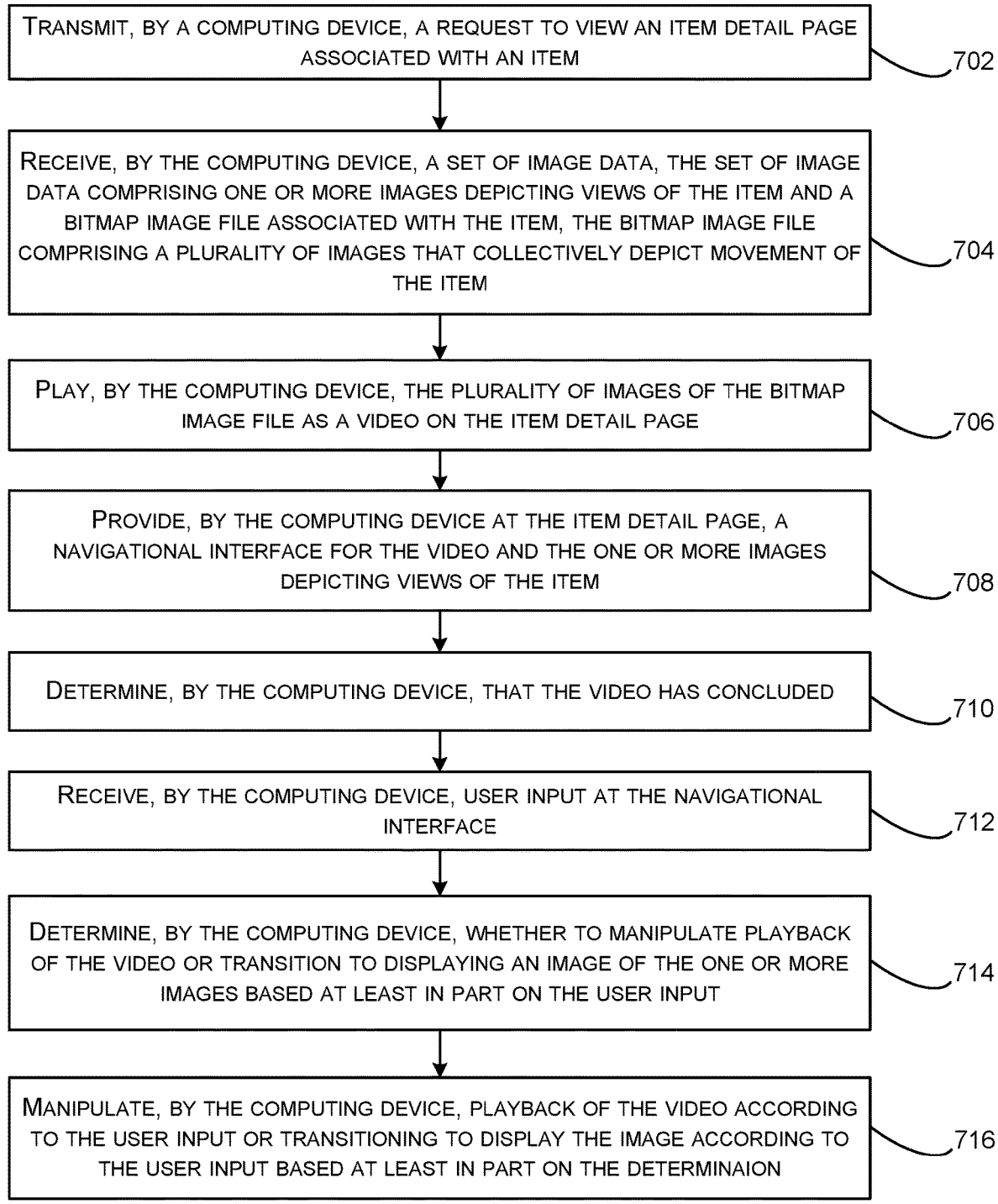
FIG. 7 is a flowchart illustrating an example method for providing interactive video utilizing the interactive video engine, in accordance with at least one embodiment.

FIG. 7 is a flowchart illustrating an example method 700 for providing item information utilizing the interactive video engine 102 of FIG. 1, in accordance with at least one embodiment. A computer-readable medium may store computer-executable instructions that, when executed by at least one processor, cause at least one computer to perform instructions comprising the operations of the method 700. It should be appreciated that the operations of the method 700 may be performed in any suitable, not necessarily the order depicted in FIG. 7. Further, the method 700 may include additional, or fewer operations than those depicted in FIG. 7. The operations of method 700 may be performed by a user device (e.g., the user device 504 of FIG. 5) at which at least a portion of the interactive video engine 102 is executed.

The method 700 may begin at 702, where a request to view an item detail page associated with an item may be received by a computing device (e.g., the user device 504 via the application 506 of FIG. 5). The request may indicate a particular network address and/or a particular item identifier associated with the item detail page.

At 704, a set of image data may be received by the computing device (e.g., the user device 504). The set of image data may be provided by data processing module 610 and/or the output module 614 of the interactive video engine 102 operating as part of the service provider computer(s) 510. In some embodiments, the set of image data may comprise one or more images depicting views of the item and a bitmap image file associated with the item. According to some embodiments, the bitmap image file comprising a plurality of images that individually and/or collectively depict movement of the item. In some embodiments, production details (e.g., an order by which images of the bitmap image file are to be played, and/or start frame, and/or end frame, looping instructions, transitions, timing and/or duration of production breaks, HTML data to be displayed and instructions detailing what frame(s) and location within the frame(s) at which the HTML data should be presented (overlaid), etc.) may be provided with the bitmap image file. In some cases, the production details may be provided in a separate file of any suitable format (e.g., XML, JSON, etc.).

At 706, the computing device (e.g., the user device 504) may play (e.g., via the application 506 of FIG. 5) the plurality of images of the bitmap image file as a video on the item detail page. As a non-limiting example, the plurality of images of the bitmap image file may be provided as a video via an output module of the interactive video engine 102 operating as part of the user device 504 and/or the application 506.

At 708, the computing device may provide (e.g., via the output module 614), at the item detail page, a navigational interface for the video and the one or more images depicting views of the item. By way of example, the computing device (e.g., the user device 504 via the output module 614) may provide a navigational interface such as area 334 of FIG. 3.

At 710, the computing device may determine that the video has concluded. By way of example, the data processing module 610 (operating at the user device 504) may receive indication that an end frame of the bitmap image file/video has been reached.

At 712, the computing device may receive user input at the navigational interface. For example, the user may utilize an input device (e.g., a finger, a stylus, a mouse, etc.) to "scrub," gesture, and/or drag left or right within the area 334.

At 714, the computing device may determine whether to manipulate playback of the video or transition to displaying an image of the one or more images based at least in part on the user input. By way of example, should the user scrub/drag to the right, the video may be replayed (or the scrubbing/dragging can cause the video to be rewound/played backwards), whereas if the user scrubs/drags to the left, an image of the one or more images (depicting views of the item) may be displayed.

Figure 8:
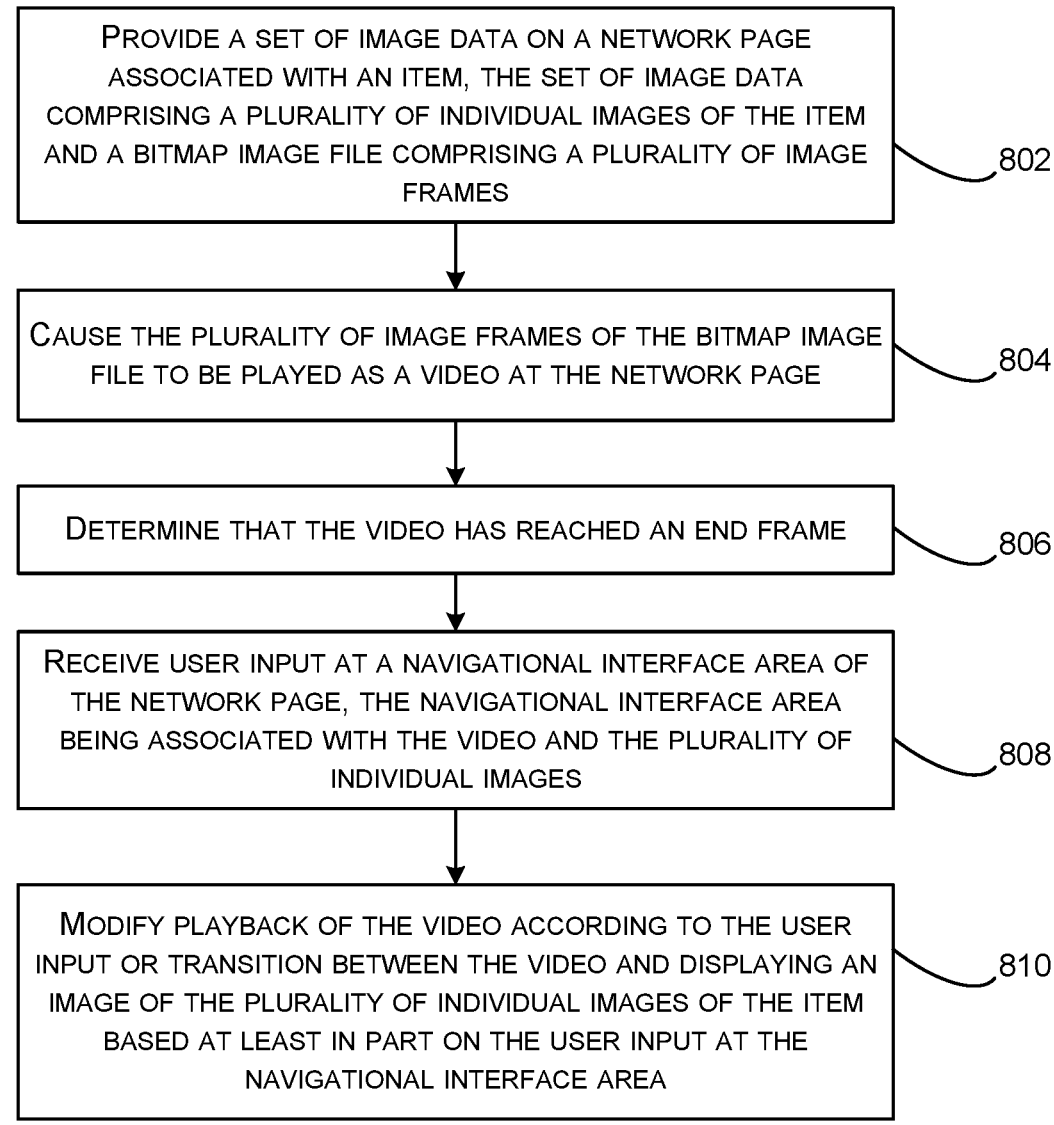
FIG. 8 is a flowchart illustrating another example method for providing interactive video utilizing the interactive video engine, in accordance with at least one embodiment.

FIG. 8 is a flowchart illustrating one further example method 800 for providing item information utilizing the interactive video engine 102 of FIG. 1, in accordance with at least one embodiment. It should be appreciated that the operations of the method 800 may be performed in any suitable, not necessarily the order depicted in FIG. 8. Further, the method 800 may include additional, or fewer operations than those depicted in FIG. 8. The operations of method 800 may be performed by a user device (e.g., the user device 504 of FIG. 5) at which at least a portion of the interactive video engine 102 is executed. The user device 504 (hereinafter in this example referred to as "the computing device") may include a processor and a memory storing computer-readable instructions that, upon execution by the processor, configure the computing device to perform the operations of the method 800.

The method 800 may begin at 802, where a set of image data is provided (e.g., via the output module 614) on a network page associated with an item. In some embodiments, the set of image data comprising a plurality of individual images of the item and a bitmap image file comprising a plurality of image frames.

At 804, the output module 614 may cause the plurality of image frames of the bitmap image file to be played as a video at the network page.

At 806, the data processing module 610 may determine that the video has reached an end frame.

At 808, user input may be received (e.g., by the data processing module 610) at a navigational interface area (e.g., area 334 of FIG. 3) of the network page. In some embodiments, the navigational interface area may have been provided by the output module 614 along with the video and the plurality of individual images at the network page.

At 810, playback of the video may be modified (e.g., by the output module 614) according to the user input or the output module 614 may transition between the video and displaying an image of the plurality of individual images of the item based at least in part on the user input at the navigational interface area. By way of example, should the user scrub/drag to the right in the navigational interface area, the video may be replayed (or the scrubbing/dragging can cause the video to be rewound/played backwards), whereas if the user scrubs/drags to the left, an image of the one or more images (depicting views of the item) may be displayed.

Figure 9:
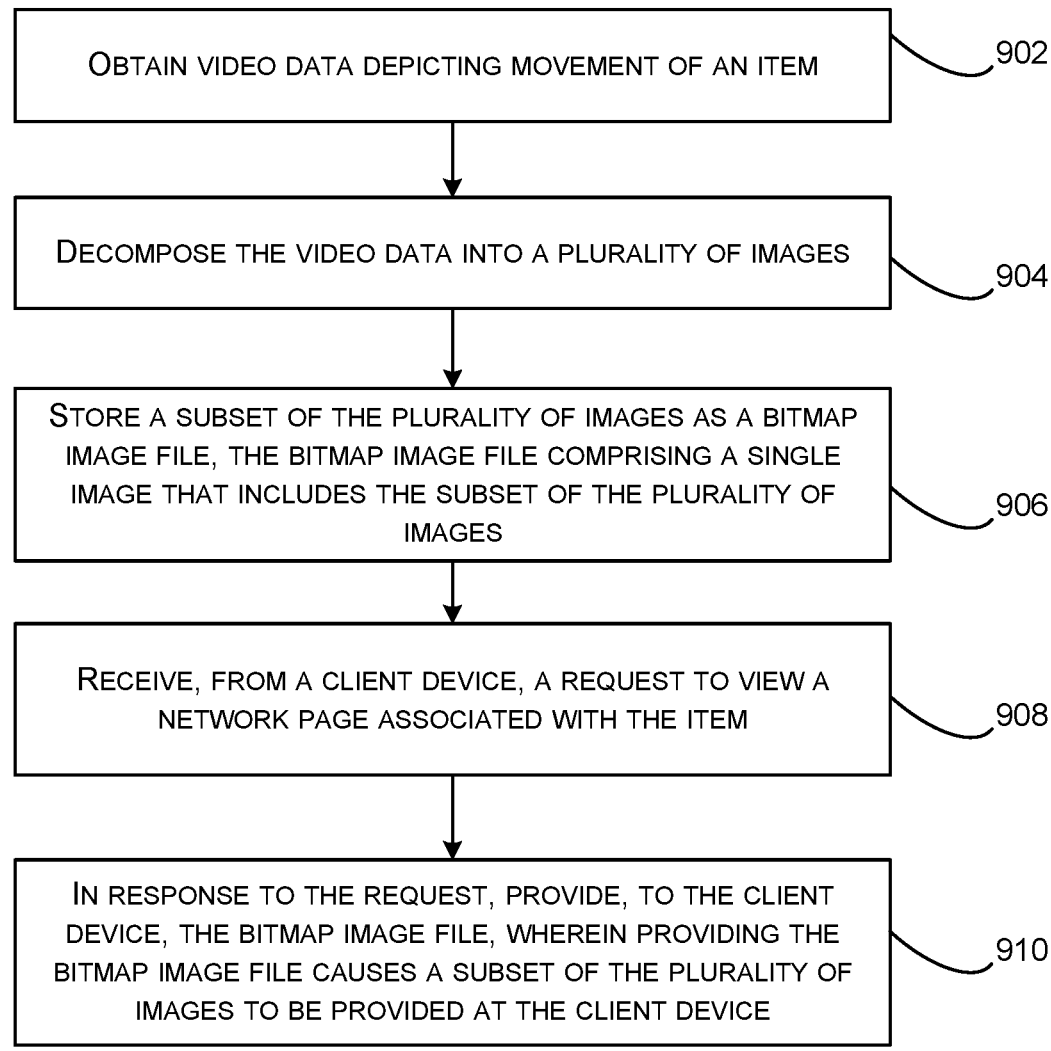
FIG. 9 illustrates an environment in which various embodiments can be implemented.

FIG. 9 is a flowchart illustrating one further example method 900 for providing item information utilizing the interactive video engine 102 of FIG. 1, in accordance with at least one embodiment. It should be appreciated that the operations of the method 900 may be performed in any suitable, not necessarily the order depicted in FIG. 9. Further, the method 900 may include additional, or fewer operations than those depicted in FIG. 9. The operations of method 900 may be performed by a service provider computer (e.g., the service provider computer(s) 510 of FIG. 5) at which at least a portion (e.g., the image file manager 612 of FIG. 6) of the interactive video engine 102 is executed. The service provider computer may include a computer-readable storage medium having stored thereon computer-executable instructions that, when executed by a processor, cause the processor to perform the operations of the method 900.

The method 900 may begin at 902, where video data depicting movement of an item may be obtained. By way of example, the video data may comprise a prerecorded video which is received by the image file manager 612. The prerecorded video may be of any suitable format and/or duration.

At 904, the video data (e.g., the prerecorded video) may be decomposed into a plurality of images. By way of example, the video data may include a 30-second video of a model wearing a dress who spins around in the dress. In some embodiments, the video data of the 30-second video may decompose into 120 video frames, although any suitable number of video frames is possible.

At 906, a subset of the plurality of images may be stored (e.g., by the image file manager 612) as a bitmap image file. In some embodiments, the bitmap image file may comprise a single image that includes the subset of the plurality of images. In a non-limiting example, the image file manager 612 may process the 120 video frames to determine a number of video frames that are similar (e.g., over a threshold degree of similarity) with respect to other video frames. To include these frames may cause the video to be unnecessarily long and/or the bitmap image file to contain, essentially, duplicative images. Accordingly, the image file manager 612 may be configured to remove at least some of the duplicative images in order to reduce an overall file size associated with the bitmap image file. In some embodiments, the image file manager 612 may utilize all of the images, regardless of the degree to which they may be similar to other images of the video.

At 908, a request may be received from a user device to view a network page associated with the item. The request may be received by the service provider computer(s) via the data processing module 610 or another suitable module for processing network page requests.

At 910, in response to the request, the service provider computer(s) may provide, to the client device, the bitmap image file. In some embodiments, providing the bitmap image file may cause a subset of the plurality of images to be provided at the client device. By way of example, upon receiving the bitmap image file, the user device may be configured to provide the plurality of images (or at least some portion of those images) as a video of the item.

Figure 10:
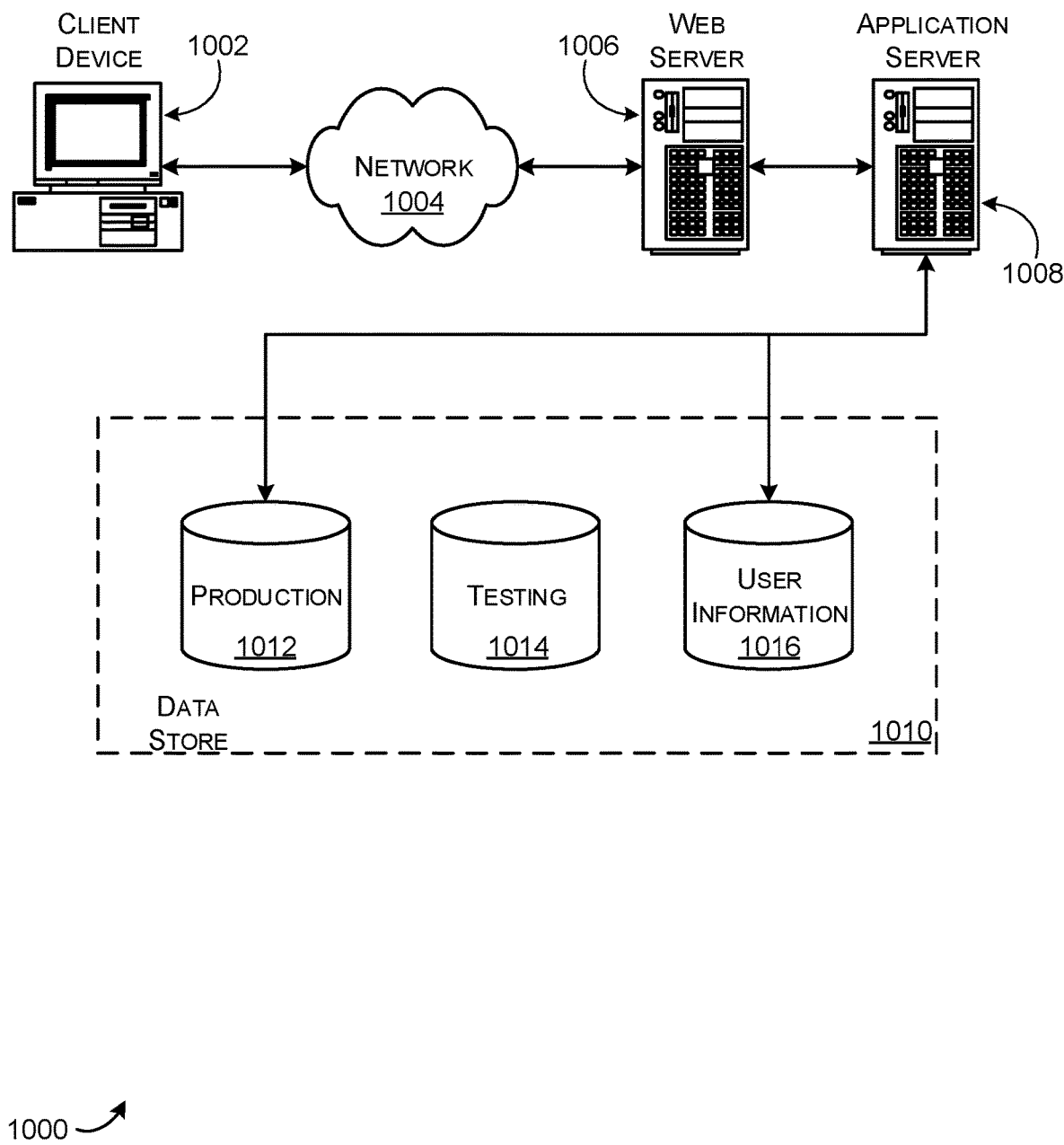
FIG. 10 illustrates aspects of an example environment for implementing aspects in accordance with various embodiments.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes a client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

transmitting, by a computing device, a request to view an item detail page associated with an item;

receiving, by the computing device, a set of image data, the set of image data comprising one or more images depicting respective views of the item and a bitmap image file associated with the item, the bitmap image file comprising a plurality of images;

playing, by the computing device, the plurality of images of the bitmap image file as a video on the item detail page within a viewing area;

providing, by the computing device at the item detail page, a navigational interface for navigating between the video and the one or more images depicting the respective views of the item, the navigational interface comprising the viewing area within which the video is displayed;

determining, by the computing device, that the video has concluded;

receiving, by the computing device, user input at the navigational interface;

determining, by the computing device, whether to manipulate the navigational interface and playback of the video or navigating from the video in the viewing area to an image of the one or more images based at least in part on the user input, wherein navigating from the video causes the image to replace the video in the viewing area;

manipulating, by the computing device, the navigational interface and the playback of the video when the user input indicates a dragging action; and transitioning to displaying the image within the viewing area when the user input indicates a swiping action, the image depicting a stationary view of the item.

2. The computer-implemented method of claim 1, wherein the computing device further provides, on the item detail page, a set of selection elements associated with the one or more images, wherein selection of at least one of the set of selection elements causes the computing device to display, in the viewing area, at least one image of the one or more images.

3. The computer-implemented method of claim 2, wherein transitioning to displaying the image navigates a focus from the video to the image of the one or more images.

4. The computer-implemented method of claim 1, wherein the bitmap image file is generated from a video file associated with the item, the video file being decomposed into a set of video frames, the set of -video frames corresponding to at least one of the plurality of images of the bitmap image file.

5. A computing device, comprising:
   a processor; and
   a memory storing computer-readable instructions that, upon execution by the processor, configure the computing device to:
      provide a set of image data on a network page associated with an item, the set of image data comprising a plurality of images depicting respective views of the item and a bitmap image file comprising a plurality of image frames;
      cause the plurality of image frames of the bitmap image file to be played as a video at the network page within a viewing area;
      determine that the video has reached an end frame;
      receive user input at a navigational interface of the network page, the navigational interface being associated with the video and the plurality of images, the navigational interface comprising the viewing area within which the video is displayed;
      determine whether to manipulate the navigational interface and playback of the video or navigate from the video in the viewing area to an image of the plurality of images based at least in part on the user input, wherein navigating from the video causes the image to replace the video in the viewing area;
      manipulate the navigational interface and the playback of the video when the user input indicates a dragging action; and
      transition to displaying the image within the viewing area when the user input indicates a swiping action, the image depicting a stationary view of the item.

6. The computing device of claim 5, wherein the bitmap image file is a sprite sheet.

7. The computing device of claim 5, wherein the computing device is further configured to:
   provide a set of selection elements at the network page, the set of selection elements corresponding to each of the plurality of images of the item;
   receive additional user input at the set of selection elements; and
   transition to displaying, in the viewing area, a particular image of the plurality of images based at least in part on the additional user input.

8. The computing device of claim 5, wherein the video depicts movement of the item.

9. The computing device of claim 5, wherein the computing device is further configured to:
   receive production details associated with the video, wherein causing the bitmap image file to be played as the video causes the video to be played according to the production details.

10. The computing device of claim 5, wherein the computing device is further configured to:
    display, at the network page, a first image frame of the plurality of image frames of the bitmap image file;
    download a portion of the bitmap image file while displaying the first image frame;
    determine that the bitmap image file has been fully downloaded; and
    begin the playback of the video in response to the determination that the bitmap image file has been fully downloaded.

11. The computing device of claim 5, wherein the bitmap image file comprises the plurality of image frames as a single image.

12. The computing device of claim 5, wherein the bitmap image file is generated from a video file associated with the item, the video file being decomposed into a set of video frames, the set of video frames corresponding to at least one of the plurality of image frames of the bitmap image file.

13. The computing device of claim 5, wherein utilizing the bitmap image file reduces a number of requests made to a server for loading content of the network page.

14. The computing device of claim 5, wherein the computing device is further configured to:
    provide, at the network page, the navigational interface for the video, wherein the navigational interface comprises a slider.

15. A non-transitory computer-readable storage medium having stored thereon computer-executable instructions that, when executed by a processor, cause a computing device to perform operations comprising:
    providing a set of image data on a network page associated with an item, the set of image data comprising a plurality of images depicting respective views of the item and a bitmap image file comprising a plurality of image frames;
    causing the plurality of image frames of the bitmap image file to be played as a video at the network page within a viewing area;
    determining that the video has reached an end frame;
    receiving user input at a navigational interface of the network page, the navigational interface being associated with the video and the plurality of images, the navigational interface comprising the viewing area within which the video is displayed;
    determining whether to manipulate the navigational interface and playback of the video or replace the video with an image of the plurality of images within the viewing area based at least in part on the user input;
    manipulating the navigational interface and the playback of the video when the user input indicates a dragging action; and
    replacing the video in the viewing area with the image when the user input indicates a swiping action, the image depicting a stationary view of the item.

16. The non-transitory computer-readable storage medium of claim 15, wherein the computing device performs further operations comprising:
    providing a set of selection elements at the network page, the set of selection elements corresponding to each of the plurality of images of the item;

receiving additional user input at the set of selection elements; and transitioning to displaying, in the viewing area, a particular image of the plurality of images based at least in part on the additional user input.

17. The non-transitory computer-readable storage medium of claim 15, wherein the computing device performs further operations comprising receiving production details associated with the video, wherein causing the bitmap image file to be played as video causes the video to be played according to the production details.

18. The non-transitory computer-readable storage medium of claim 15, wherein the computing device performs further operations comprising:

displaying, at the network page, a first image frame of the plurality of image frames of the bitmap image file;

downloading a portion of the bitmap image file while displaying the first image frame;

determining that the bitmap image file has been fully downloaded; and beginning playback of the video in response to the determination that the bitmap image file has been fully downloaded.

19. The non-transitory computer-readable storage medium of claim 15, wherein utilizing the bitmap image file reduces a number of requests made to a server for loading content of the network page.

20. The non-transitory computer-readable storage medium of claim 15, wherein the plurality of images depicting respective views of the item and the plurality of image frames of the video are received within the bitmap image file associated with the item.

\* \* \* \* \*